United States Patent [19]
Izzat

[11] Patent Number: 5,947,744
[45] Date of Patent: Sep. 7, 1999

[54] TRAINING APPARATUS AND METHOD FOR CORONARY ARTERY ANASTOMOSES FEATURING SIMULATED PULSATING HEART

[75] Inventor: Mohammad Bashar Izzat, Rawda, Syrian Arab Rep.

[73] Assignee: The Chinese University of Hong Kong, New Territories, The Hong Kong Special Administrative Region of the People's Republic of China

[21] Appl. No.: 09/009,946

[22] Filed: Jan. 21, 1998

[51] Int. Cl.[6] .................................................. G09B 23/28
[52] U.S. Cl. ........................... 434/272; 434/267; 434/262
[58] Field of Search ...................... 434/272, 262, 434/267

[56] References Cited

U.S. PATENT DOCUMENTS

| | | | |
|---|---|---|---|
| 2,871,579 | 2/1959 | Niiranen et al. ............................. | 35/17 |
| 3,154,881 | 11/1964 | Elwell ...................................... | 434/272 |
| 3,662,076 | 5/1972 | Gordon et al. ........................... | 434/267 |
| 3,888,233 | 6/1975 | Ware ....................................... | 128/1 |
| 3,999,309 | 12/1976 | Gonzalez .................................. | 35/17 |
| 4,167,070 | 9/1979 | Orden ...................................... | 35/17 |
| 4,182,054 | 1/1980 | Wise et al. ................................ | 35/17 |
| 4,601,665 | 7/1986 | Messmore ................................ | 434/267 |
| 4,718,876 | 1/1988 | Lee ......................................... | 446/295 |
| 4,773,865 | 9/1988 | Baldwin ................................... | 434/268 |
| 4,907,973 | 3/1990 | Hon ......................................... | 434/262 |
| 5,112,228 | 5/1992 | Zouras ..................................... | 434/272 |
| 5,149,270 | 9/1992 | McKeown ................................ | 434/262 |
| 5,199,877 | 4/1993 | Page ........................................ | 434/262 |
| 5,312,259 | 5/1994 | Flynn ....................................... | 434/265 |
| 5,320,537 | 4/1994 | Watson .................................... | 434/272 |
| 5,356,295 | 10/1994 | Grosz ....................................... | 434/267 |
| 5,403,191 | 4/1995 | Tuason ..................................... | 434/262 |
| 5,403,192 | 4/1995 | Kleinwaks et al. ...................... | 434/272 |
| 5,425,644 | 6/1995 | Szinicz .................................... | 434/268 |
| 5,584,701 | 12/1996 | Lampotang et al. ..................... | 434/272 |
| 5,634,797 | 6/1997 | Montgomery ........................... | 434/268 |
| 5,692,907 | 12/1997 | Glassel et al. ........................... | 434/262 |
| 5,769,641 | 6/1998 | Lampotang et al. ..................... | 434/272 |
| 5,800,179 | 9/1998 | Bailey ..................................... | 434/262 |
| 5,873,732 | 2/1999 | Hasson .................................... | 434/262 |
| 5,873,863 | 2/1999 | Komlosi et al. ......................... | 604/259 |

FOREIGN PATENT DOCUMENTS

| 1504660 A1 | 8/1989 | Russian Federation ....... G09B 23/28 |
|---|---|---|

*Primary Examiner*—Jessica J. Harrison
*Assistant Examiner*—David A. Fleming
*Attorney, Agent, or Firm*—Townsend and Townsend and Crew; Kenneth R. Allen

[57] ABSTRACT

A device and method for performing coronary artery grafting on a model heart. In one embodiment, a motor-operated cam displaces a surface on which a model cardiac vasculature is mounted or integrated. The active surface moves to simulate the beating of the heart during a live operation. The trainee performs the simulated procedure while the model heart pulsates.

20 Claims, 7 Drawing Sheets

TRAINING APPARATUS AND METHOD FOR CORONARY ARTERY ANASTOMOSES FEATURING SIMULATED PULSATING HEART

BACKGROUND OF THE INVENTION

This invention relates to surgical training and more particularly to device to be used as training subjects for heart surgery.

The known morbidity associated with cardiopulmonary bypass and the concept that trauma of access is often worse than the surgical procedure itself have resulted in the recent surge of interest in "off-pump" coronary surgery and minimally invasive direct coronary artery bypass (MIDCAB). These keyhole or port-access procedures are undergoing extensive development by companies such as Heartport of Redwood City, Calif., and Cardiothoracic Systems of Portola Valley, Calif. Indeed, there is already substantial experience with coronary artery grafting without cardiopulmonary bypass to indicate that this approach will become a permanent part of a cardiac surgeon's armamentarium.

The principal technical challenge for the interventional cardiothoracic surgeon in these "off-pump" and minimally invasive techniques is the performance of accurate coronary anastomoses on constantly moving target vessels of a beating heart. The targeted blood vessels are small (typically 2 mm in diameter) and constantly moving with each heartbeat. The significance of this endeavor is clearly reflected by the range of instruments and techniques which have been developed to reduce the motion of the segment of the coronary vessel to be grafted. Still, there is no alternative to the skill of the surgeon in determining the outcome of this surgical procedure.

Currently, no cost-effective training method is available to achieve this skill before attempting the technique on patients. Surgeons must now practice on patients, with the resultant occasional blocked anastomoses, occluded grafts, and myocardial infarctions. Although animal laboratories may be used to practice other surgical procedures, such as video-assisted left internal mammary artery (LIMA) harvest to gain experience and confidence before operating on patients, animal laboratories are not well suited for practicing "beating-heart" anastomoses. Unlike LIMA harvest, the animal model develops ventricular fibrillation very easily during beating heart procedures, usually within minutes of snaring the left anterior descending coronary artery for the procedure. Furthermore, animal laboratory facilities remain expensive and not widely available.

For these reasons, it would be desirable to provide improved devices and methods for practicing body lumen anastomoses on a beating or reciprocally moving object. It would be particularly desirable if such devices and methods overcame at least some of the problems noted above. For example, it would be desirable to provide a realistic, inexpensive, re-usable, and portable device on which a trainee can practice during his own time instead of being limited by the availability of animal laboratory facilities. Preferably the device should simulate a variety of different heart beat rates and beat displacements. As "beating-heart" surgery and other new approaches evolve and become established as standard practice, parallel training methods must be developed to prepare trained surgeons. The skill to perform a new surgical procedure can be developed through practices on inanimate simulators and, later, through preceptorship programs. At least some of the objectives should be met by each of the aspects of the present invention described hereinafter.

SUGARY OF THE INVENTION

According to the present invention, a device is provided for practicing anastomoses of a body lumen on a moving surface. In particular, the present invention provides a model for practicing coronary artery grafting on a beating heart.

In one embodiment, a training device for practicing anastomoses on a beating object comprises a platform displacement device and a platform coupled to the displacement device. The platform defines a surface which has a model of a cardiac vasculature mounted on or integrated on the surface. The surface moves to simulate the moving surface of the heart during beating. The displacement device is typically a vertical displacement device and which moves the platform reciprocally between a first position and a second position in a vertical motion.

The displacement device may comprise of a motor coupled to a cam, such as a disc with at least one protrusion extending beyond the outer diameter of the disc. As the disc spins, these protrusions cause the platform to rise and fall. There may be a number of protrusions which are spaced circumferentially apart in an uneven manner to simulate irregular heart beats. The cam may also have a plurality of discs. These discs may spin at different rates to also create irregular heart beats.

A method according to the present invention for practicing body lumen anastomoses comprises the steps of reciprocally moving a platform with a model of a body lumen and attaching a graft lumen vessel to the model of a body lumen. The platform may be reciprocally moving vertically or in irregular time intervals. Typically, the platform moves at a rate between about 60 to 100 cycles per minute.

A further understanding of the nature and advantages of the invention may be realized by reference to the remaining portions of the specification and the drawings.

DESCRIPTION OF THE PREFERRED EMBODIMENT

The present invention provides devices and methods for practicing body lumen anastomoses on a beating or reciprocally moving object. The apparatus of the present invention is not limited to use in the vascular system, and may also be advantageously employed in training for surgical procedures to be performed on other body lumens in a patient.

The term "displacement" as used herein is defined to include vertical, horizontal, or combined vertical/horizontal motion. Embodiments of the present invention may provide this range of combined motions to best mimic the actual motions of a human heart. The term "platform" as used herein is defined as an object with a surface, not necessarily flat, that provides a displaceable support for a model of human vasculature or body lumen. The platform is not limited to any particular shape or configuration.

Figure 1:
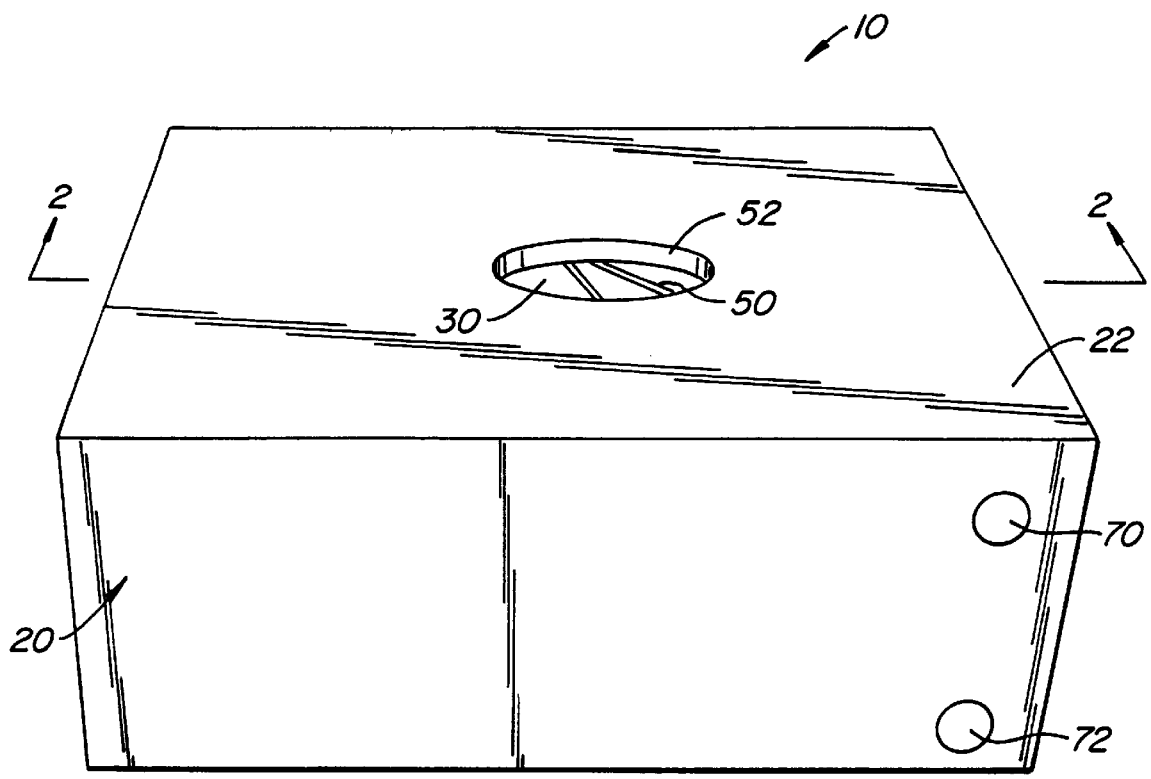
FIG. 1 is a perspective view of a preferred embodiment of the training device of the present invention.
Figure 2:
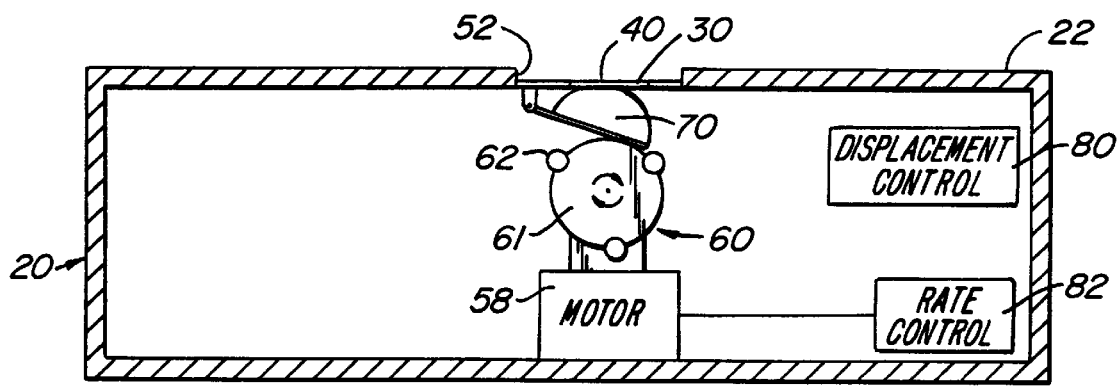
FIG. 2 is a cross-sectional view of the device of claim 1.
Figure 3:
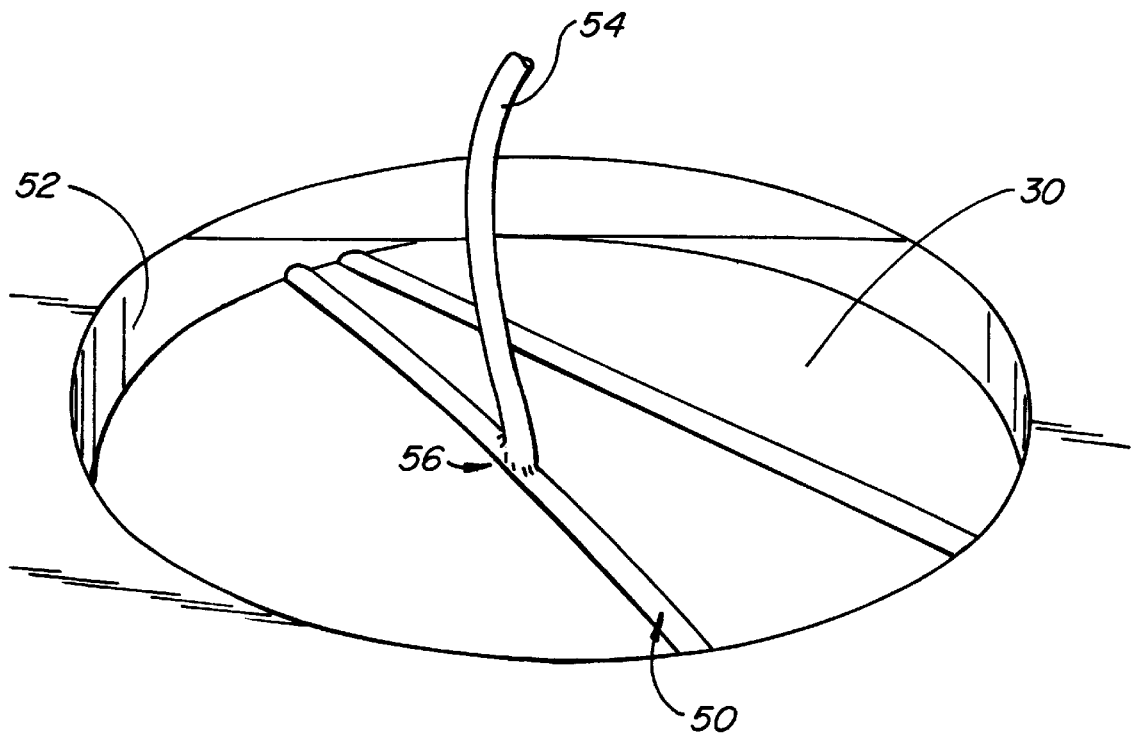
FIG. 3 is a detailed perspective view of a typical model body lumen with a graft lumen vessel.

Referring to FIGS. 1–2, a training device according to the present will be described. As seen in FIG. 1, the beating heart anastomoses training device 10 typically comprises a housing 20 having a moving platform 30 defining an upper surface 40. The moving platform 30 holds a model of a coronary artery 50 and is typically in a recessed cavity 52 on the upper surface 22 of the housing 20 to simulate an opening in the thoracic cavity. As shown in FIGS. 1–3, the device 10 described here is a simulator in which a coronary artery representative 50 (usually a porcine mammary artery) is mounted on a floating platform 30 which mimics the epicardial surface. In particular, FIG. 3 shows a graft lumen vessel 54 attached to the model 50 by stitches 56. The "anastomoses" performed by a student may be tested by direct injection of dye in the grafted tube to test for lumenal patency or leakage.

Figure 4:
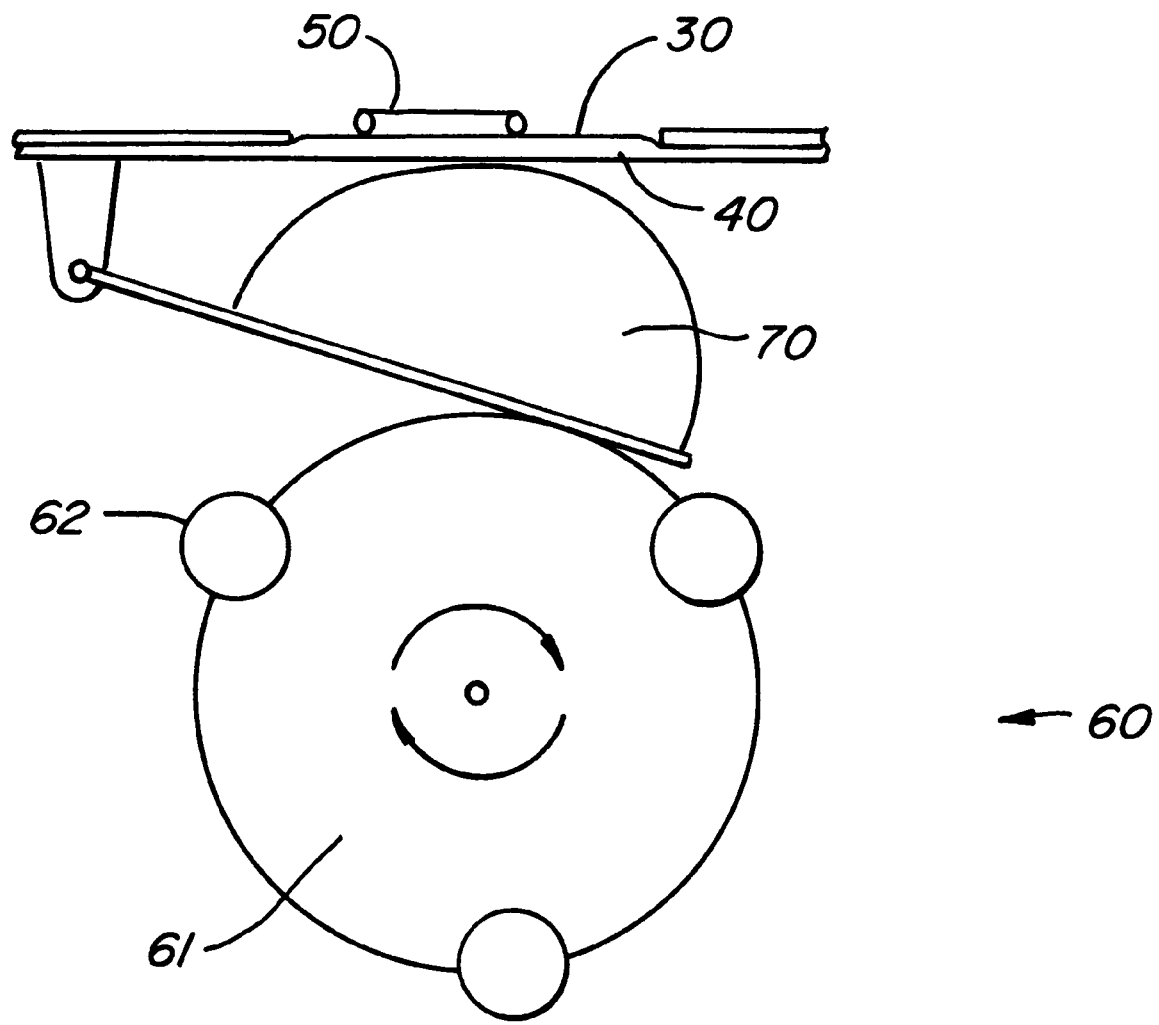
FIGS. 4–5 are a detailed views of one embodiment of a platform displacement device.
Figure 5:
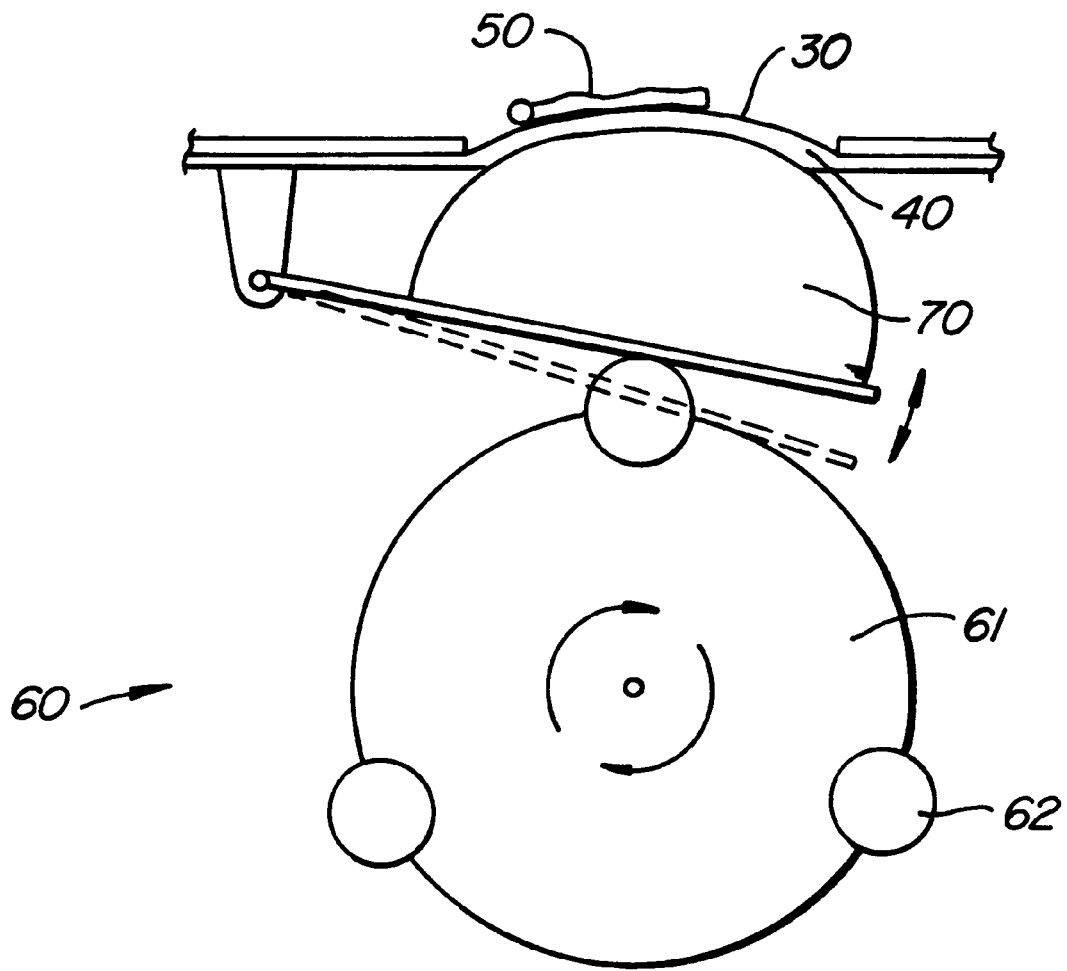

In a preferred embodiment (FIGS. 1–2), the housing 20 contains a motor 58 and cam assembly 60 which reciprocally moves the platform 30 to simulate the motion of a beating heart. The platform 30 moves in a generally up/down motion (FIGS. 4–5) at an adjustable rate between about 60 and 100 cycles per minute, preferably between about 40 and 150 cycles per minute. The platform 30 moves between a first position shown in FIG. 4 to a second, displaced position shown in FIG. 5. The motor 58 underneath the platform 30 carries cam assembly 60 comprising a disc 61 with projecting wheels or protrusions 62. With the rotations of the motor 58, the wheels or protrusions 62 on the spinning disc 61 elevate hemispherical shaped member 70 intermittently as indicated by arrow 72, which moves the platform 30 to simulate heart beats. As shown in FIG. 5, the hemispherical member 70 preferably causes a rounded deformation and displacement of the platform 30 that simulates the beating of heart tissue. The hemispherical shaped member 70 is preferably hinged to the housing 20 and operatively coupled between the cam assembly 60 and the platform 30. The platform 30 may be made of a variety of elastomeric materials such as foam or polymer material which can deform when the member 70 presses against it. Alternative embodiments may mount the vasculature or body lumen 50 directly on the member 70 and do away with the platform 30.

Adjustments can be made to vary the conditions of the anastomoses training. For example, adjusting the speed of motor rotations can reproduce heart rates between 40–150 beat/min. Varying the circumferential distance between the projecting wheels 62 causes the platform 30 to rise at irregular intervals, simulating various dysrrhythmias (i.e. irregular heartbeats). It is also possible to adjust the degree of excursion or displacement of the platform 30 to make the training procedure more challenging. The "heart" rate and degree of excursion may be adjusted by controls 80 and 82.

Figure 6:
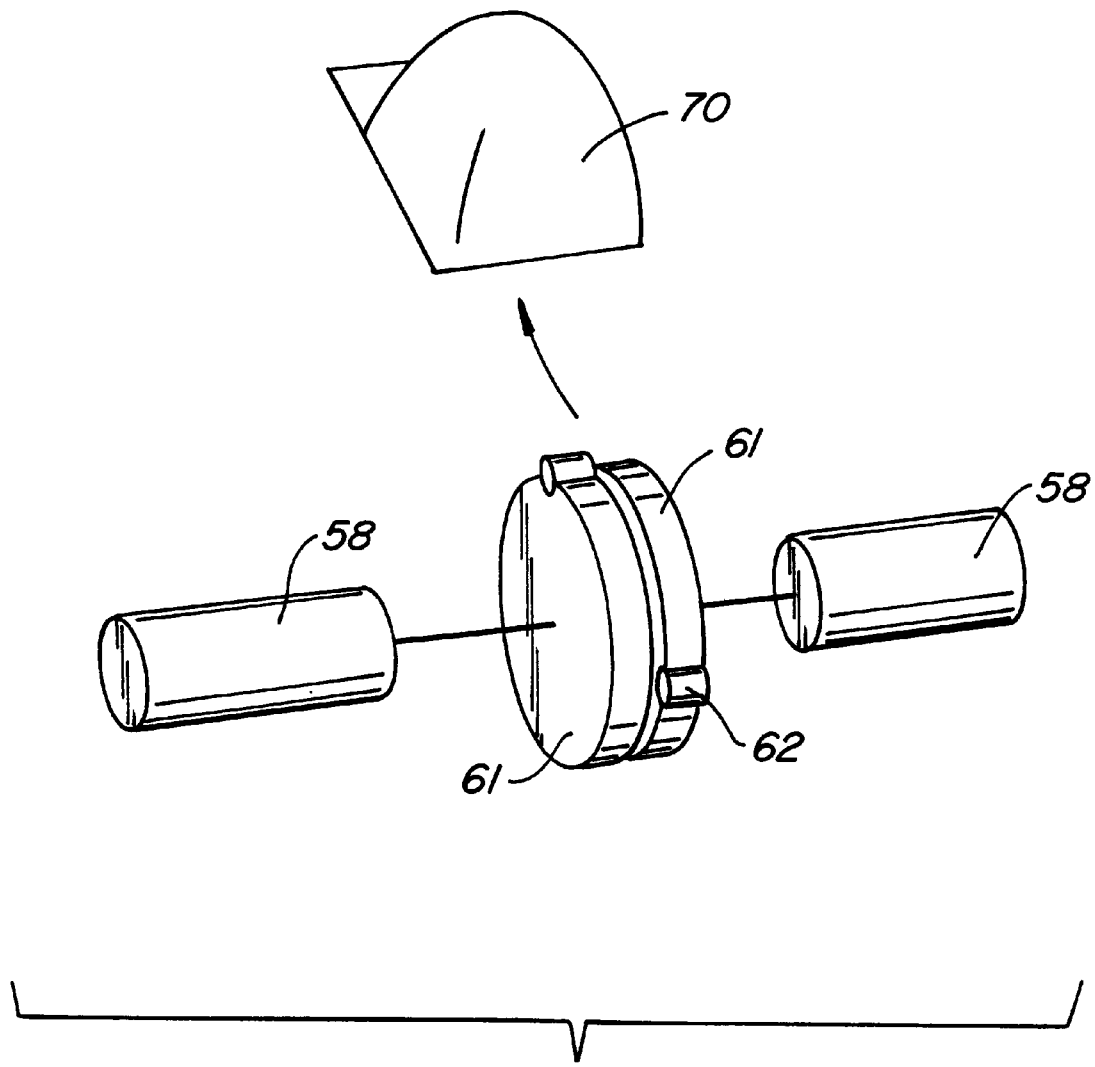
FIG. 6 is an exploded perspective view of an alternative embodiment of the displacement device.
Figure 7:
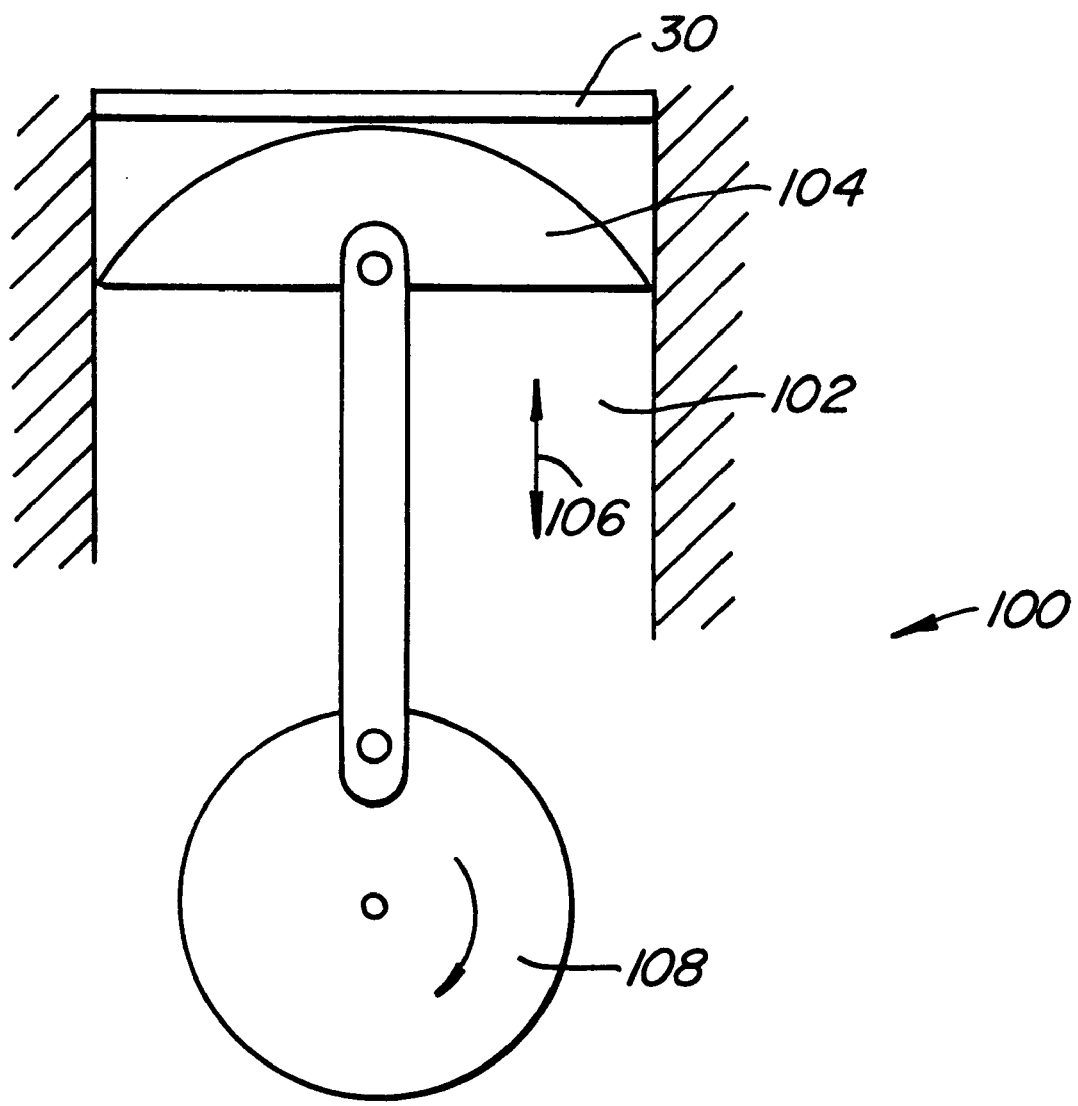
FIG. 7 shows a piston type platform displacement device.

As can be imagined, in addition to the embodiment disclosed, a variety of other different roller and cam shapes may be used to achieve the desired motion of the moving platform 20. As shown in FIG. 6, the cam assembly 60 may use two discs 61 coupled to separate motors 58. This allows the discs 61 to rotate a different rates and have different vertical displacements to provide a greater variety of heartbeat patterns. A further alternative shown in FIG. 7 is a piston-type device that uses a cam mechanism 100 mounted in a vertical channel 102. The member 104 moves reciprocally as indicated by arrow 106 as the disc 108 rotates. Other cam designs know in the art may also be used to create movement of the vasculature or body lumen 50.

Figure 8:
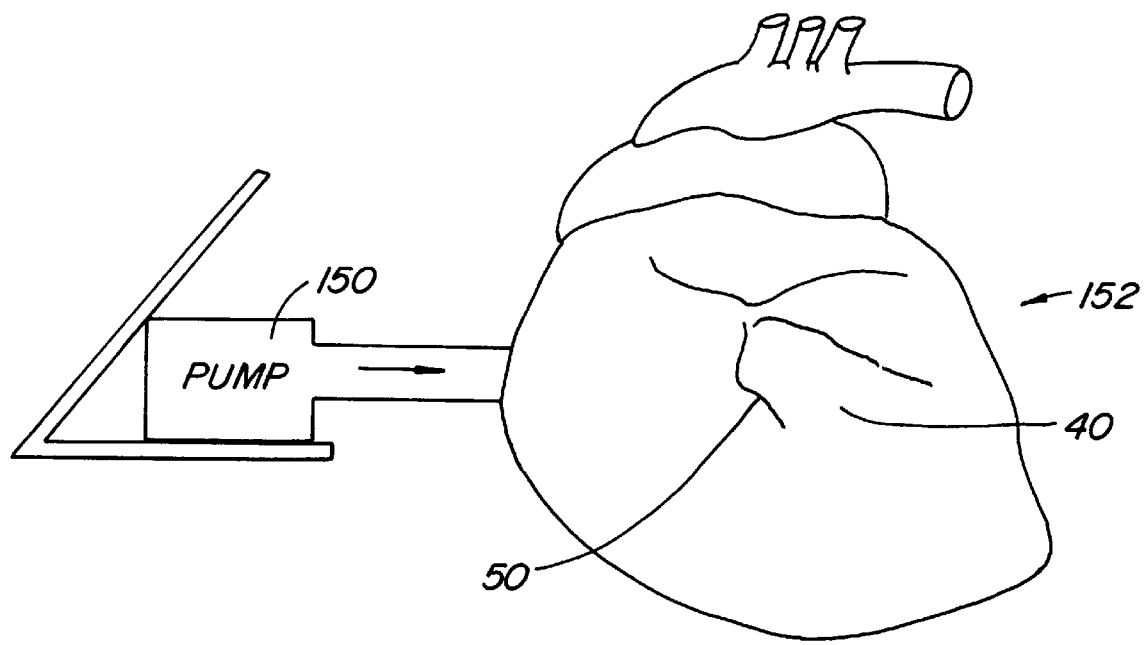
FIG. 8 shows a fluid activated inflatable training device.
Figure 9:
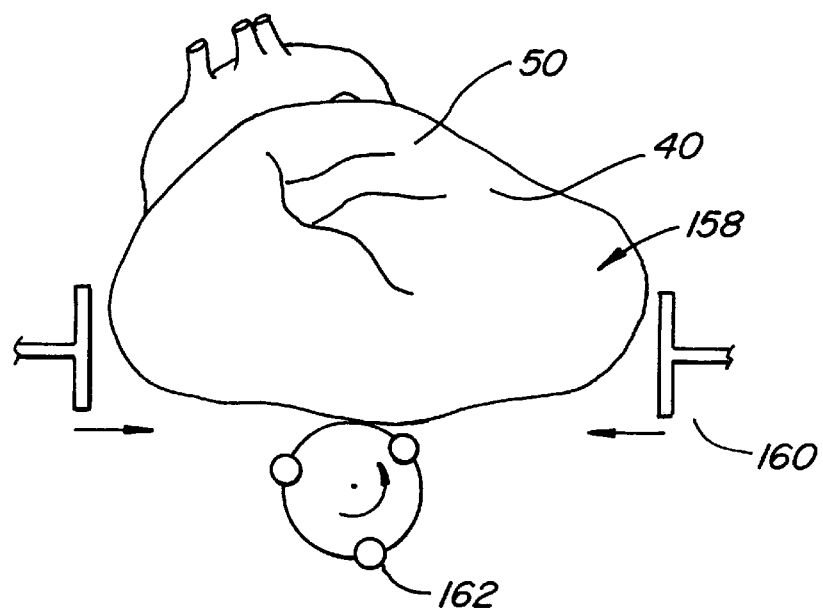
FIG. 9 shows a further alternative embodiment of the training device.

Additionally, a variety of other types of devices may be used to stimulate the movement of a surface 40. For example, one embodiment shown FIG. 8 uses a valve or pump 150 to regulate the entry of fluid such as gas or liquid into an inflatable heart simulator 152. A chamber (not shown) within the simulator 152 receives the fluid. The pumping of fluid into and out of the inflatable heart simulator 152 causes the chamber and thus the heart to expand and contract. The device may be an open system where fluid is released from the inflatable device 152 or it may be a closed system where fluid is recirculated between different parts of the system (i.e. fluid travelling back into the pump 150 from the chamber when the pump is not activated). A further embodiment shown in FIG. 9 creates movement of the body lumen model 50 by striking a gelatinous mass 158 which results in a vibrating type motion. A compressive device 160 or a striking device 162 impart movement onto the body lumen 50 mounted on the material in a reciprocal manner.

Although the foregoing invention has been described in some detail by way of illustration and example, for purposes of clarity of understanding, it will be obvious that certain changes and modifications may be practiced within the scope of the appended claims.

What is claimed is:

1. A training device for practicing anastomoses on a beating object, said device comprising:

a platform displacement device; and a platform coupled to said displacement device, said platform defining a movable surface having a model of a body lumen on said surface and adapted to allow the attachment of a graft lumen vessel.

2. A training device of claim 1 wherein said displacement device is a vertical displacement device and said platform moves reciprocally between a first position and a second position.

3. A training device of claim 2 wherein said displacement device comprises of a motor coupled to a cam.

4. A training device of claim 3 wherein said cam is a disc with at least one protrusion extending beyond the outer diameter of the disc.

5. A training device of claim 4 comprising of a plurality of protrusions, said protrusions unevenly spaced circumferentially apart.

6. A training device of claim 4 wherein said cam comprises a plurality of discs with at least one protrusion extending beyond the outer diameter of each of said discs.

7. A training device of claim 1 wherein:

said platform comprises of a elastomeric sheet of material, said model of the body lumen mounted on top of said sheet; and said displacement device comprises a hemispherical shaped member for creating a platform with a rounded surface when the platform is upwardly displaced.

8. A training device of claim 6 further comprising a housing, wherein the platform is contained within a recessed opening of the housing to simulate an opening within the thoracic cavity.

9. A training device of claim 1 wherein:

said platform comprises of a hemispherical shaped member, said model of the body lumen mounted on top of said hemispherical shaped member.

10. A method for practicing anastomoses on a beating object, the method comprising:

reciprocally moving a platform with a model of a body lumen mounted on the platform; and attaching a graft lumen vessel to said model of a body lumen while said platform is in motion.

11. A method according to claim 10 wherein the moving step comprises reciprocally moving the platform vertically.

12. A method according to claim 10 wherein the moving step comprises moving the platform in irregular time intervals.

13. A method according to claim 10 wherein the moving step comprises moving the platform at a rate between about 40 to 150 cycles per minute.

14. A method as in claim 10 wherein said attaching step comprises suturing a graft lumen vessel to the body lumen.

15. A method as in claim 10 further comprising injecting fluids in said body lumen to test for fluid leakage of attached graft lumen.

16. A training device for practicing anastomoses on a beating object, said device comprising:

a heart simulator having a plurality of tubular structures mounted to said surface and adapted to simulate human blood vessels;

a mover coupled to said heart simulator to reciprocally move said surface between a first position and a second position;

wherein the tubular structures are adapted to be connected to a graft tubular structure.

17. A training device of claim 16 wherein the displacement device is fluidly coupled to the platform.

18. A training device of claim 16 wherein the floating platform is adapted to mimic an epicardial surface.

19. A training device of claim 16 wherein the tubular structure is adapted to allow the attachment of the graft vessel by stitches.

20. A training device of claim 16 wherein the displacement device is a pump fluidly coupled to said platform.

* * * * *

UNITED STATES PATENT AND TRADEMARK OFFICE
CERTIFICATE OF CORRECTION

PATENT NO. : 5,947,744
DATED : September 7, 1999
INVENTOR(S) : Mohammad Bashar Izzat It is certified that error appears in the above-identified patent and that said Letters Patent is hereby corrected as shown below:

Column 2, line 1, delete "Sugary" and insert therefor - - Summary - -

Signed and Sealed this

Ninth Day of May, 2000

Attest:

Q. TODD DICKINSON

Attesting Officer

Director of Patents and Trademarks